(12) United States Patent
Hirth

(10) Patent No.: US 9,795,006 B2
(45) Date of Patent: Oct. 17, 2017

(54) LOW-VOLTAGE ALTERNATING CURRENT-BASED LED LIGHT WITH BUILT-IN COOLING AND AUTOMATIC OR MANUAL DIMMING

(71) Applicant: Yvette Seifert Hirth, San Francisco, CA (US)

(72) Inventor: Yvette Seifert Hirth, San Francisco, CA (US)

( * ) Notice: Subject to any disclaimer, the term of this patent is extended or adjusted under 35 U.S.C. 154(b) by 0 days.

(21) Appl. No.: 15/068,607

(22) Filed: Mar. 13, 2016

(65) Prior Publication Data
US 2017/0265274 A1    Sep. 14, 2017

(51) Int. Cl.
| | |
|---|---|
| H05B 39/00 | (2006.01) |
| H05B 37/02 | (2006.01) |
| F21V 29/77 | (2015.01) |
| H05B 33/08 | (2006.01) |
| F21V 3/04 | (2006.01) |
| F21S 9/02 | (2006.01) |
| F21V 29/67 | (2015.01) |
| F21V 25/02 | (2006.01) |
| A01G 7/04 | (2006.01) |
| A01G 9/20 | (2006.01) |
| A01G 31/02 | (2006.01) |
| F21Y 115/10 | (2016.01) |

(52) U.S. Cl.
CPC ......... *H05B 37/0227* (2013.01); *A01G 7/045* (2013.01); *A01G 9/20* (2013.01); *A01G 31/02* (2013.01); *F21S 9/02* (2013.01); *F21V 3/0418* (2013.01); *F21V 25/02* (2013.01); *F21V 29/67* (2015.01); *F21V 29/77* (2015.01); *H05B 33/0809* (2013.01); *H05B 33/0851* (2013.01); *F21Y 2115/10* (2016.08)

(58) Field of Classification Search
CPC ............ H05B 33/0815; H05B 33/0818; H05B 41/2828; H05B 41/3921; H05B 41/3927; H05B 41/28; H05B 41/34; H05B 33/0803; H05B 39/09; H05B 33/0809
USPC ..................................... 315/291, 307, 200 R
See application file for complete search history.

(56) References Cited

U.S. PATENT DOCUMENTS

2006/0022214 A1* 2/2006 Morgan .................... F21K 9/00
257/99
2008/0285271 A1* 11/2008 Roberge .................. F21S 8/033
362/235

(Continued)

*Primary Examiner* — Minh D A
(74) *Attorney, Agent, or Firm* — Christopher Peil; Law Office of Christopher Peil

(57) ABSTRACT

A low-voltage alternating current-based LED light with built-in cooling and automatic or manual dimming. As it is self-cooled with fan failure protection, the light can be safely run in conditions that are near-hostile to its operation, with little possibility of damage. The light is movable along the XY axes of a grid system and can be either fixed in position in the Z axis or can be movable up and down the Z axis. The light can be equipped with either manual dimming using a standard potentiometer, or with automatic dimming via sensors and local network connectivity. The device prevents line-voltage electric shocks as the input voltage is low-voltage AC; in embodiments, about the same voltage as a doorbell, and the input current is 3 A. The device is also self-cooled, and will shut down if its fan is not running so as to prevent thermal overloads.

8 Claims, 22 Drawing Sheets

(56) References Cited

U.S. PATENT DOCUMENTS

| | | | | |
|---|---|---|---|---|
| 2012/0080944 A1* | 4/2012 | Recker | ................... | H02J 9/02 |
| | | | | 307/25 |
| 2013/0214699 A1* | 8/2013 | Jonsson | ................... | F21V 3/00 |
| | | | | 315/297 |

* cited by examiner

Dinah Might Light Model2 - V1.000

Known Sensors

| Sensor Name | Serial Number | Connected To Light(s) |
|---|---|---|
| BAS0 | DMSHS0037391 | BAA, BAC |
| BAS1 | DMSHS0037188 | BAF, BAG |
| BAS2 | DMSHS0036824 | BAD, BAE |
| BAS3 | DMSHS0037849 | BAB, BAH |

LOW-VOLTAGE ALTERNATING CURRENT-BASED LED LIGHT WITH BUILT-IN COOLING AND AUTOMATIC OR MANUAL DIMMING

BACKGROUND

Technical Field

The present device relates to hydroponic LED lighting.

CROSS REFERENCE TO RELATED APPLICATIONS

This application is related to U.S. patent application Ser. No. 15/068,604, filed on Mar. 13, 2016, and entitled "Hanging Three Dimensional Grid System for Lighting, Data, and Power," the entirety of which is incorporated herein by this reference thereto.

BACKGROUND

For many years hydroponic and other farmers and growers of flora have used indoor lighting, with some using specialized growing techniques to improve their yield per square foot. Most of those growing techniques are based on "even lighting," lighting which shines equally bright over all hydroponic areas.

However, not all flora grows at the same rate, and not all branches of one plant grow at the same rate. Some flowers and plants grow faster, and can thus dominate the indoor lighting scenario, which can be disastrous for those plants and flowers that do not grow as fast—truly a case of "only the strong survive". A small difference in plant or flower height can easily result in much more light reaching the taller plants and flowers, and far less reaching the lower ones due to the inverse square rule, light blocking and shadows.

SUMMARY

A low-voltage alternating current-based LED light with built-in cooling and automatic or manual dimming. As it is self-cooled with fan failure protection, the light can be safely run in conditions that are near-hostile to its operation, with little possibility of damage. The light is movable along the XY axes of a grid system and can be either fixed in position in the Z axis or can be movable up and down the Z axis. The light can be equipped with either manual dimming using a standard potentiometer, or with automatic dimming via sensors and local network connectivity. The device prevents line-voltage electric shocks as the input voltage is low-voltage AC; in embodiments, about the same voltage as a doorbell, and the input current is 3 A. The device is also self-cooled, and will shut down if its fan is not running so as to prevent thermal overloads.

The device prevents line-voltage electric shocks as the input voltage is low-voltage AC; in embodiments, about the same voltage as a doorbell, and the input current is 3 A. The device is also self-cooled, and will shut down if its fan is not running so to prevent thermal overloads.

BRIEF DESCRIPTION OF THE DRAWINGS

Various other objects, features, and attendant advantages of the present device will become more fully appreciated as the same becomes better understood when considered in conjunction with the accompanying drawings, in which like reference characters designate the same or similar parts throughout the several views, and wherein:

FIG. 19 shows a sensor management display of the automatic dimming application.

DEFINITIONS

Figure 1:
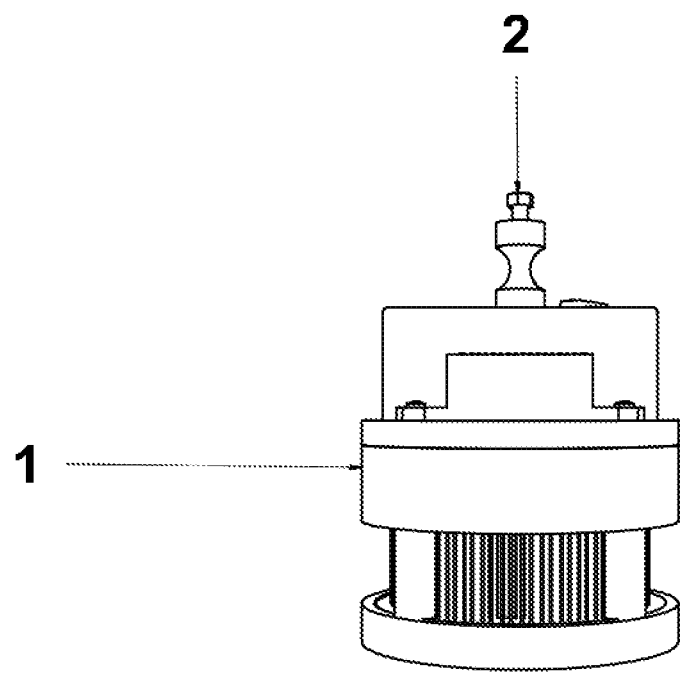
FIG. 1 shows an assembled view of a z-axis-fixed light.

"CPU" shall be defined as either a microprocessor, or a microcontroller, or a programmable logic controller, or as some combination of one or more of the above-listed components in a configuration that will run software program instructions;

"Disk" shall be defined as the solid-state disk drive(s) of any form factor, including microSD cards, SD cards, compact flash cards, et al, that is mounted on the printed circuit board or otherwise inside the device and is/are thus included within the device;

"LED" shall be defined as any type of light emitting diode;

"Non-volatile memory" shall be defined as either the electronically erasable programmable rewriteable memory contained within the CPU or otherwise within the device, for example, EEPROM, or FLASH memory;

"Read from disk" shall be defined as the combination of software commands that initiate the read command(s) to the disk and wait for it/them to complete;

"Read from nonvolatile" shall be defined as the combination of software commands that initiate the read command to EEPROM or FLASH and wait for it to complete;

"VDD" shall be defined as the input voltage of an integrated circuit or discrete silicon component;

"Write to disk" shall be defined as the combination of software commands that initiate the read and write command(s) to the disk and wait for it/them to complete; and "Write to nonvolatile" shall be defined as the combination of software commands that initiate the write command to EEPROM or Flash and wait for it to complete.

DETAILED DESCRIPTION

A low-voltage alternating current-based LED light with built-in cooling and automatic or manual dimming. As it is self-cooled with fan failure protection, the light can be safely run in conditions that are near-hostile to its operation, with little possibility of damage. The light is movable along the XY axes of a grid system and can be either fixed in position in the Z axis or can be movable up and down the Z axis. The light can be equipped with either manual dimming using a standard potentiometer, or with automatic dimming via sensors and local network connectivity. The device prevents line-voltage electric shocks as the input voltage is low-voltage AC; in embodiments, about the same voltage as a doorbell, and the input current is 3 A. The device is also self-cooled, and will shut down if its fan is not running so as to prevent thermal overloads.

In embodiments, the device is comprised of: a light which itself is comprised of many components; and a fixing mechanism.

In embodiments, the light may include:
one or more electronic circuit(s) that first rectify an appropriate AC low-voltage input to DC voltage, then using voltage regulation circuitry drop the DC voltage down to various lower DC voltages; specifically, the proper DC VDD for the CPU, the proper DC VDD for the fan circuitry, and between zero volts and an appropriate maximum DC voltage for the specific LED in the embodiment;
one or more of a plurality of cooling mechanisms, such as one or more fans; and
one or more of a plurality of heat removal systems, such as one or more heat sinks.

The fixing mechanism may be either a ¼" hex head bolt or its metric equivalents for attachment to a hanging mechanism in fixed Z axis embodiments, or a strap hanging mechanism that contains a ¼" hex head bolt for attachment to a hanging mechanism in movable Z axis embodiments, or other embodiments that contain a hex head bolt for attachment to a hanging mechanism and provide both fixed and movable Z axis functionality.

In combination with the attached drawings, the technical contents and detailed description of the present device are described hereinafter according to a number of embodiments, but should not be used to limit its scope. Any equivalent variation and modification is covered by the claims of the present device.

Referring now to FIGS. 1-20, the components of the low-voltage alternating current-based LED light with built-in cooling and automatic or manual dimming device are shown.

In FIG. 1 an embodiment of the device shows the two major components of the device can be seen: the light itself 1 and the fixing mechanism, the fixed Z axis fixing mechanism, a ¼" hex head bolt or its metric equivalent, 2.

Figure 2:
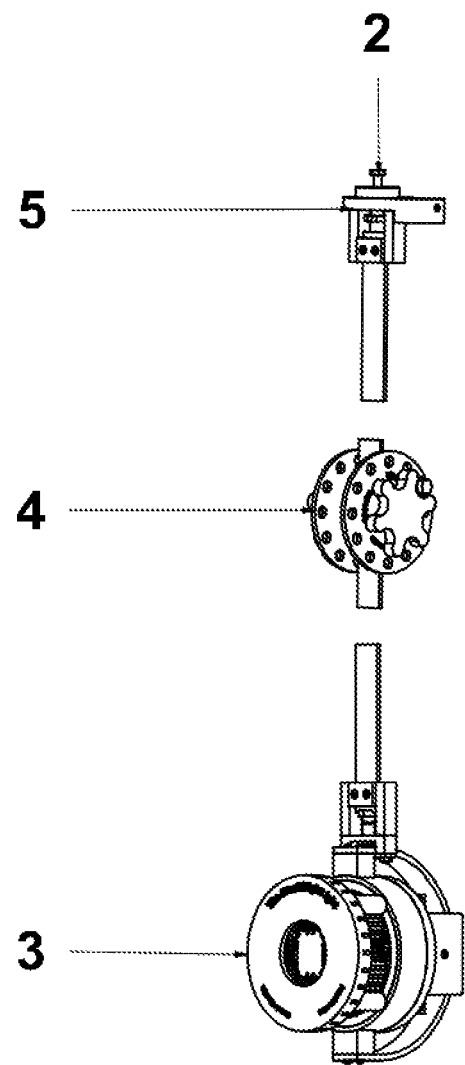
FIG. 2 shows an assembled view of a z-axis-movable light.

In FIG. 2 another embodiment of the device shows the light configured for a movable Z axis embodiment hung from a strap 3 along with multiple components of the fixing mechanism: the strap takeup reel 4 takes up excess Z axis strapping, and the strap grid hanging mechanism 5 connects the strap to the previously described grid via it's ¼" hex head bolt or metric equivalent 2.

Figure 3:
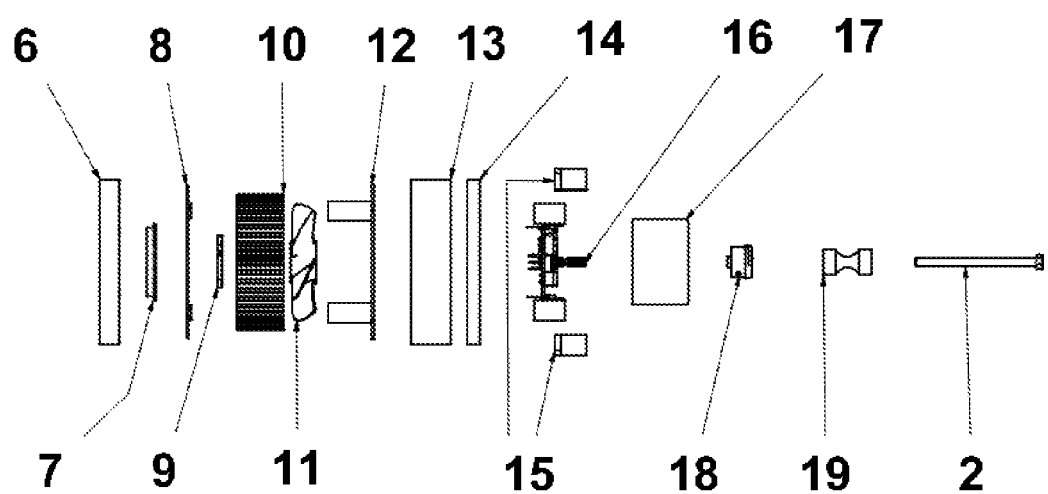
FIG. 3 shows an exploded view of a fixed, manually-dimmed light.

In FIG. 3, an embodiment of a manually dimmed light whose Z axis is fixed are shown. In the embodiment shown, a front cover 6 houses:
a round piece of plain glass, a lens, or collimator 7; and
an LED 9.

In embodiments, an LED 9 may be mounted on a heat sink 10 which may be attached to a cooling fan 11, and the heat sink 10 may be covered with a heat sink shield 12 that may be attached to the inside front cover 8 and that in turn may be attached to the front cover 6. In this embodiment, a PCB 16 is mounted on the back cover 14, its heat sinks are surrounded by heat sink cooling airflow guides 15, it is covered by a dimmer cover 17, and the back cover in turn is mounted on a main light cover 13. A potentiometer knob 19 is mounted on the PCB 16 potentiometer shaft, which indicates that this light is manually dimmed.

The inside front cover 8 prevents light and hot air from escaping backwards, while the heatsink shield 12 prevents damage from occuring to the heatsink.

In an embodiment shown in FIG. 3, a fixative mechanism for a light that is fixed along the Z axis may include a fixed light cord relief spacer 19 and a ¼" hex head bolt or its metric equivalent 2.

Figure 4:
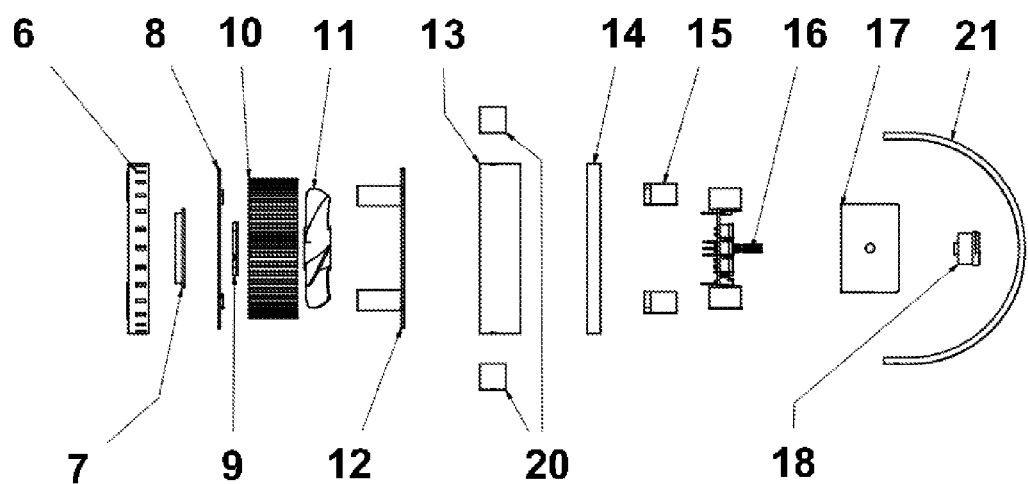
FIG. 4 shows an exploded view of a movable, manually-dimmed light.

In FIG. 4, the components of an embodiment of a manually dimmed light movable along the Z axis are shown. In the embodiment shown, all of the components of the light that are unrelated to Z axis movability are the same as those for the embodiment shown in FIG. 3. The difference between the embodiments of FIGS. 3 and 4 lies in the light tilting guide spacing blocks 20 and the light tilting guide 21. In FIG. 4, the light-tilting guide spacing blocks 20 provide spacing for the light tilting guide 21 as the light tilting guide 21 is wider than the light, because the diameter of the light tilting guide is chosen to maintain the center of gravity of the light at the same distance in a 180-degree semi-circle so that the light tilts around the center of gravity and remains in a chosen position, regardless of light angle.

Figure 5:
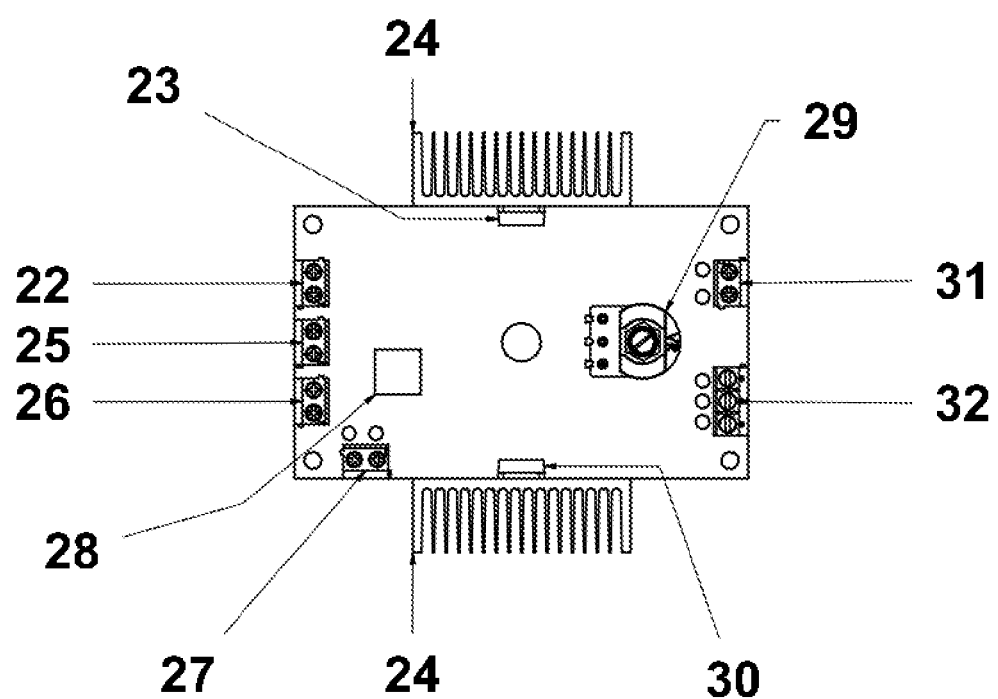
FIG. 5 shows a diagram of a manually-dimmed PCB board.

FIG. 5 provides a pictorial representation of an embodiment of the light's electronic circuitry PCB board:
an input power connector 22 brings in 36 VAC to a voltage regulator 23 mounted on one of a pair of heatsinks 24;
a connector 25 is connected to a thermistor mounted on a heatsink 24 on which a voltage regulator 23 is mounted;
a connector 26 is connected to a thermistor mounted on another heatsink 24 on which an FET 30 is mounted;
a connector 27 is connected to a thermistor mounted on the light's LED heatsink (10 in FIGS. 3 and 4);
a CPU 28;
a potentiometer 29 varies the voltage to the LED;
a connector 31 is the regulated, dimmed output voltage to the LED (9 in FIGS. 3 and 4); and
a three-conductor connector 32 for a fan, as the fan reports back RPM on conductor 3.

Figure 6:
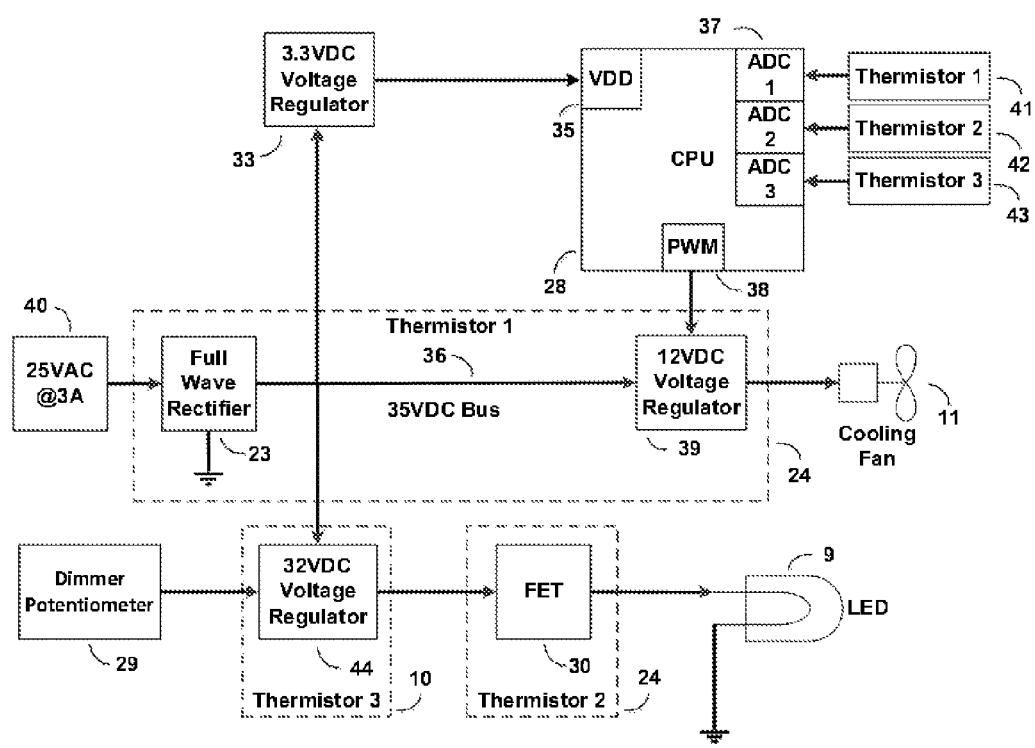
FIG. 6 shows a block diagram of the manually-dimmed light electronics.

In FIG. 6, a block diagram showing interaction of the components of the light's electronic circuitry with each other is shown. The 25 VAC input source 41 is fed into a full-wave rectifier 23 mounted on its heatsink 24 and emerges as ~35 VDC due to the rectifier's output voltage conversion of 1.414 times the input voltage. In embodiments, the ~35 VDC bus connects to:
- a 3.3 VDC regulator 33 that creates a proper VDD for the CPU 28 fed in via the VDD pin 35 of the CPU;
- a 12 VDC regulator 40 for the fan 11 which is a 12 VDC device; and
- a 0-32 VDC regulator 45 for the LED.

In the embodiment shown, the thermistors 42 43 44 mounted on the heatinks 24 24 10 report the temperature as an analog voltage or current to the CPU via the ADC subsystems 39 of the CPU 29 whose program code then compares the termistor input and determines the hottest component, at which time the program code then determines the proper fan speed to cool this hottest component and sets its PWM subsystem 38 so that the fan 11 runs at sufficient speed to cool the hottest component.

In the embodiment shown, the dimmer potentiometer 29 is a manually-turned control that changes the output voltage from the voltage regulator 45 that is fed into the LED's FET 46, thus providing varying input voltage to the LED, thus providing dimming.

Figure 7:
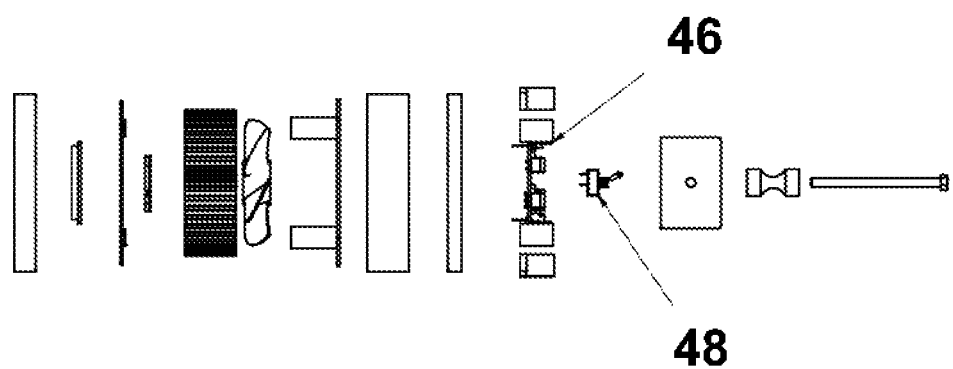
FIG. 7 shows an exploded view of a fixed, automatically-dimmed light.

In FIG. 7, the components of an embodiment of an automatically dimmed light that that are unique to the automatically-dimmed light are shown. In the embodiment shown, they consist of: unique circuitry, and thus a unique PCB board 46; and an up/down momentary switch, 48, which gives the user the ability to manually adjust the light's dimming.

Figure 8:
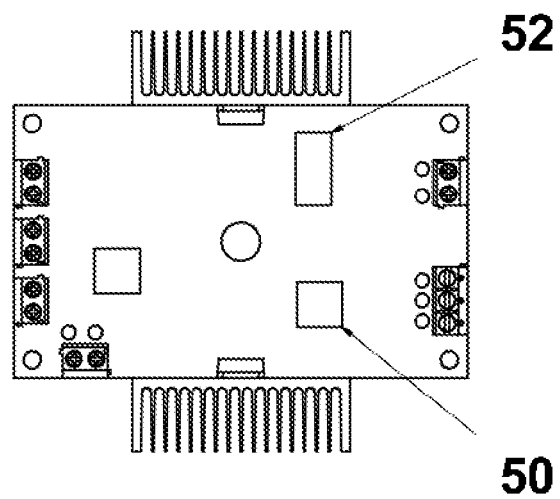
FIG. 8 shows a diagram of an automatically-dimmed PCB board.

In FIG. 8, the components of a PCB board of an automatically dimmed light that are unique to the automatically dimmed light are shown: an integrated circuit 50 that is, in various embodiments, a common local network interface that may communicate with the application described below, and another integrated circuit 52 is a digital potentiometer, whose resistance value is set by the CPU according to the application.

Figure 9:
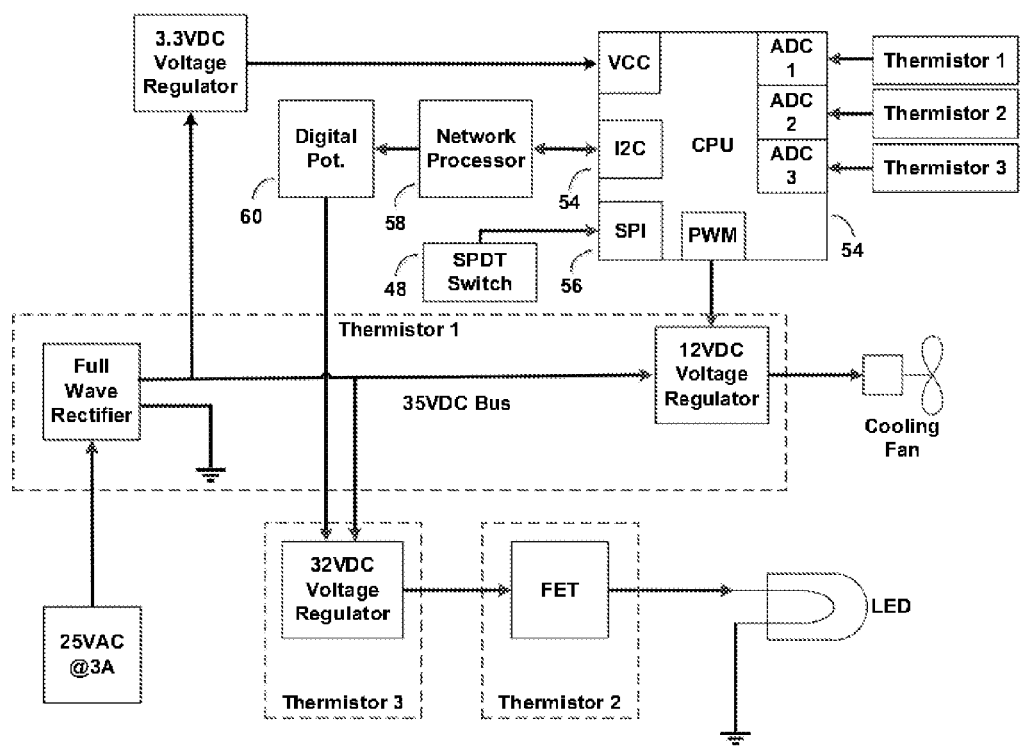
FIG. 9 shows a block diagram of the automatically-dimmed light electronics.

In FIG. 9, the components unique to an electronic circuit that supports an automatically dimmed light are shown in an embodiment:
- the CPU contains new subsystems, an I2C subsystem 54 and an SPI subsystem 56;
- there is a single-pole, double-throw momentary on-off-momentary on switch 48;
- there is an integrated circuit 58 that supports communications across, in embodiments, common local networks using their network protocols; and
- there is a digital potentiometer integrated circuit 60 which accepts commands from the CPU to set the output voltage, and thus replaces the manual dimming potentiometer.

Figure 10:
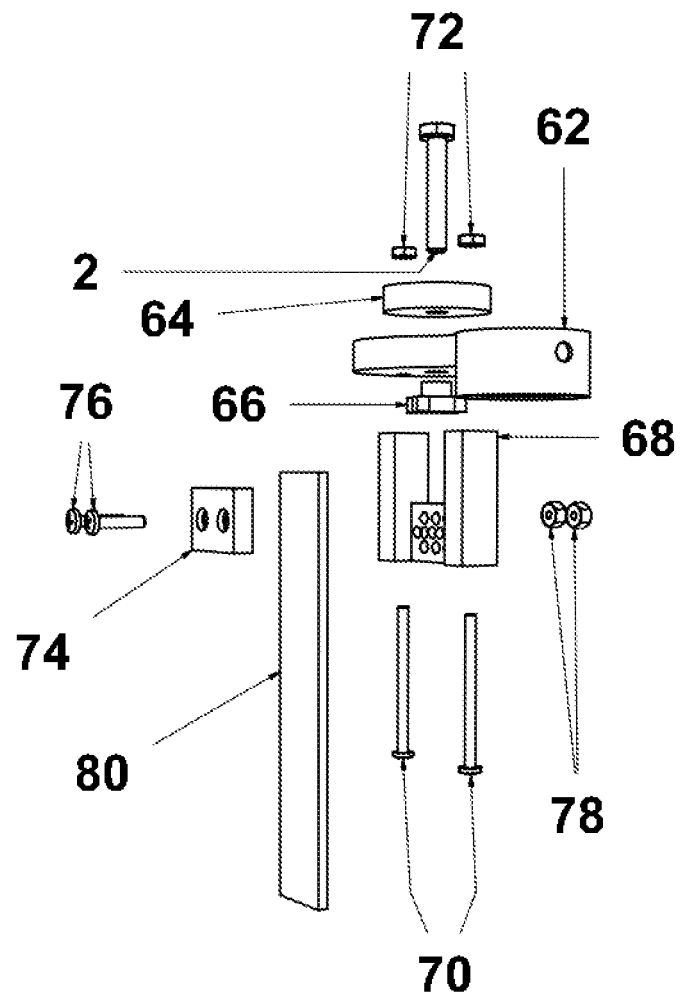
FIG. 10 shows an exploded view of a strap-hanging device for a movable light.

In FIG. 10, the components of an embodiment of a fixative mechanism that secures an embodiment of a light that is movable in the Z axis are shown: the grid clamp connection bolt 2 is shown at the top, along which a spacer 64 and the base of a hanging clamp that rotates 62 are affixed, and the two components are tightened against the grid clamp via a knob 66. Affixed to the base of the rotating hanging clamp by two screws 70 and two nuts 72 are the clamp 68 and its pressure plate 74, with said pressure plate applying pressure to the strap 80 via two screws 76 and nuts 80.

Figure 11:
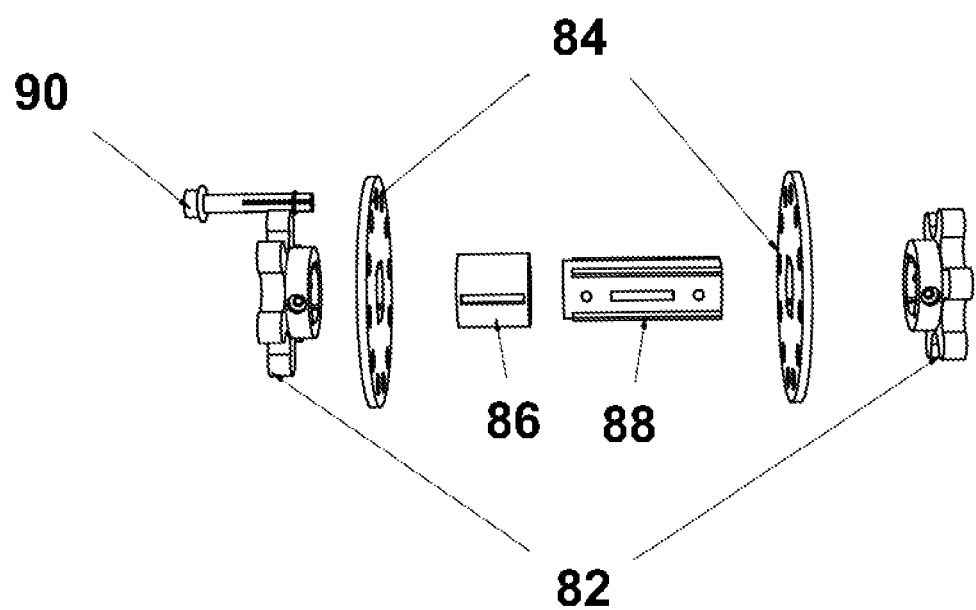
FIG. 11 shows an exploded view of a strap take-up device for a movable light.

In FIG. 11, the components of an embodiment of a strap take-up reel are shown. The strap:
- enters through one slot entry in the shaft cover 86;
- passes through the shaft 88; and
- exits the takeup reel through the other antipodally-positioned slot entry in the shaft cover 86.

In the embodiment shown, the shaft is affixed to the takeup reel sides 84 and handles 82 via splines in the shaft 88; the splines cause all parts of the takeup reel to turn at the same time, and since the strap is 'trapped' in the takeup reel shaft and shaft cover, when the takeup reel is turned via the handles 82, the strap winds around the shaft cover 86; the takeup reel is prevented from unrolling all the strapping it has taken up via a pin 90 that is inserted along an axis parallel to the axis of rotation of the takeup reel, which is the axis of the shaft 88; and the pin 90 must pass through both takeup reel sides 84 to ensure that it is securely in-place and thus the strapping will not unroll.

Figure 12:
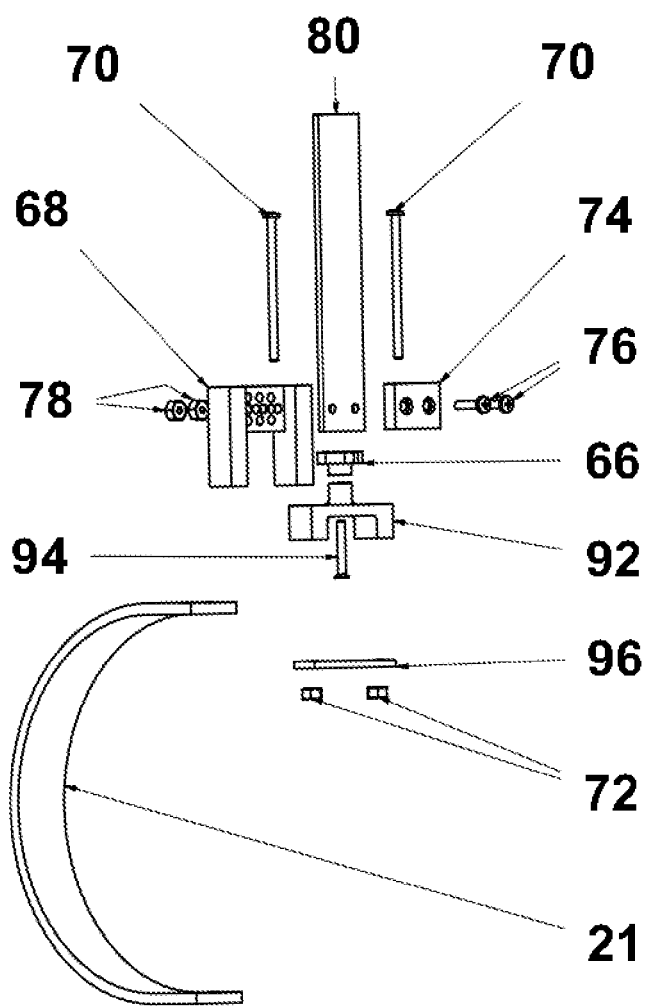
FIG. 12 shows an exploded view of a strap connection feature for a the movable light.

In FIG. 12, an embodiment of a mechanism which connects to the loose end of the strap to a light that is movable in the Z axis is shown. The loose end of the strap is the part of the strap that is not secured to the grid. In the embodiment shown, the mechanism consists of a strap hanging clamp, 68, that is connected to the strap 80 via a pressure plate 74 which is tighted using screws 76 and nuts 78, that is also connected to the light tilting guide 21 which is mounted on body of the hanging light and attached via screws 70 and nuts 72. In embodiments, the light guide clamp body 92 traps the light tilting guide 21 between a pressure plate 96 and a light guide pressure adjusting mechanism comprised of a knob 66 affixed to the end of a machine screw 94. In the embodiment shown, once the desired angle of tilt has been realized, the user may turn the knob 66 clockwise to apply pressure to the light tilting guide, which is trapped between the screw 94 and the pressure plate 96.

Figure 13:
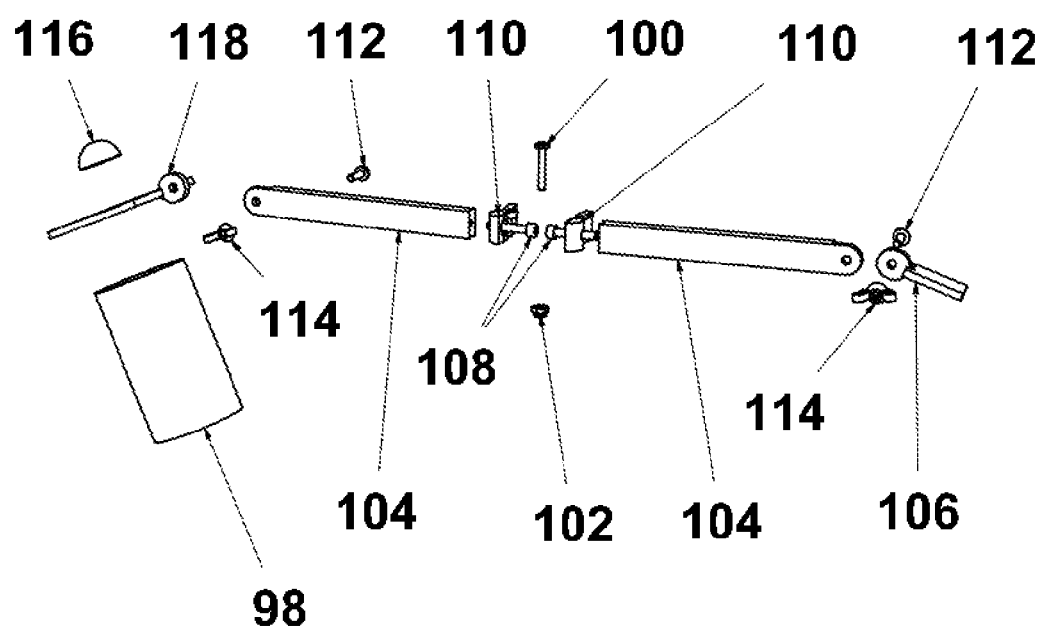
FIG. 13 shows an exploded view of a light sensor.

In FIG. 13, the components of an embodiment of a light measurement sensor mechanism are shown. The electronics (see below) and a power source, such as a battery or a power supply, are placed in a container 98 in such a manner so as the photocell is on the top and the photocell is covered by a translucent dome 116 that lets light in but keeps foreign objects out. The container 98 is affixed to a plate 118 that in turn is affixed to an arm 104 via a screw 112 and a wing nut 114 in such a manner that allows the container 98 to rotate in the YZ axes. The arm 104 is affixed to one half of a clamp 110 and secured by a screw 108 whose axis is orthogonal to the Z axis and whose threaded portion is embedded in the arm 104.

In embodiments, the other half of the light measurement sensor mechanism clamp 110 is affixed to another arm 104 via another screw 108, and on the arm of this second half of the clamp are affixed a counterweight 106 via another screw 112 and another wing nut 114. In embodiments, the counterweight's weight and moment are chosen so that movement along the YZ axes causes the moment of the weight to shift along the YZ axes, which gives the user the ability to balance out the stress along the XY axis on the light measurement sensor's clamped axis, which is the vertical Z axis.

Figure 14:
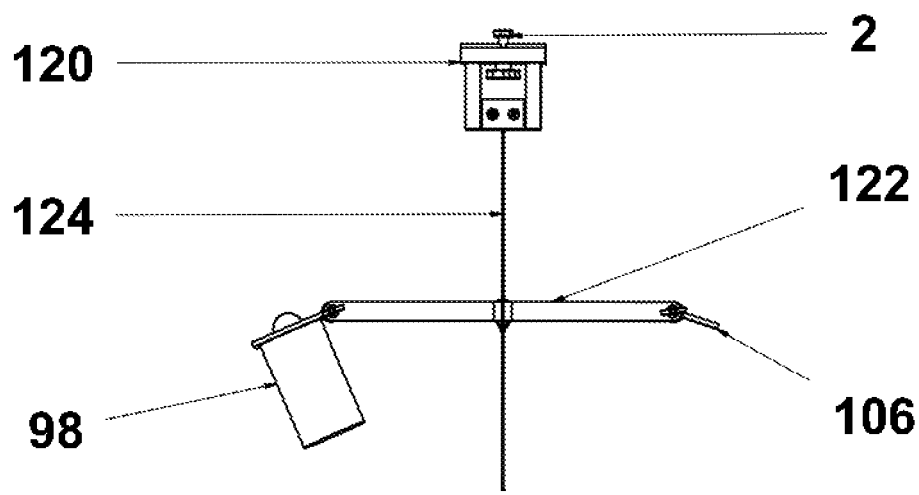
FIG. 14 shows a assembled light sensor and hanging mechanism assembly.

In FIG. 14, an embodiment of the light measurement sensor is clamped to a 1 mm wire that hangs down from a grid clamp. The counterweight is adjusted so as to produce zero stress along the wire's XY axes, thus preventing the wire from bending, and the embodiment of the light measurement sensor is positioned vertically along the 1 mm wire near the tops of plants, so as to measure the actual amount of light landing on leaves of the plant.

Figure 15:
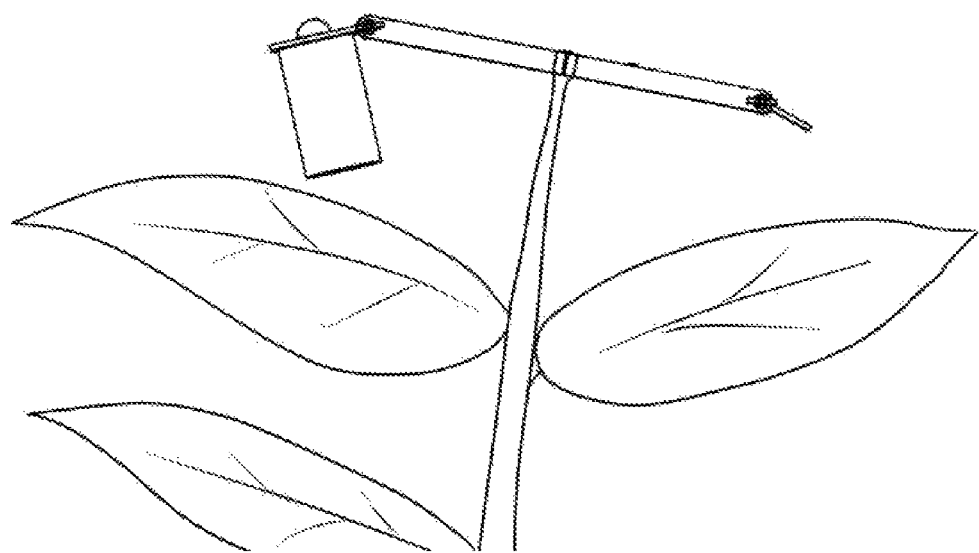
FIG. 15 shows the assembled light sensor attached to a plant.

In FIG. 15, a light measurement sensor is clamped to the stalk of a plant. The counterweight is adjusted so as to produce zero stress along the plant's XY axes, and in the embodiment shown the light measurement sensor is affixed to the plant in such a manner that its Z axis position is at the same height as a nearby leaf, so as to measure the actual amount of light landing on the leaf of the plant.

Figure 16:
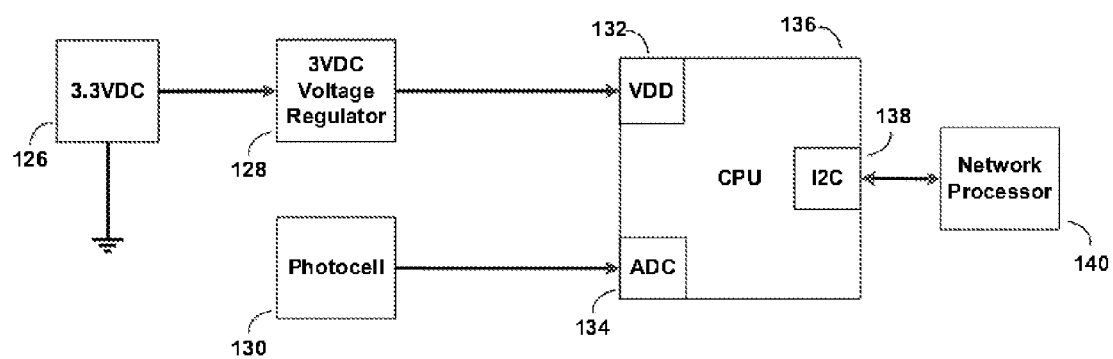
FIG. 16 shows a block diagram of the light sensor for the automatically-dimmed lights.

In FIG. 16, the block diagram of an embodiment of the light measurement sensor is shown. In embodiments, the device is powered by a 3.3 VDC power source 126 which can be a plurality of one of:
- a non-rechargeable battery or power cell;
- a rechargeable battery or power cell; and
- an AC-based power supply that outputs 3.3 VDC.

In the embodiment shown, as the input voltage can fluctuate, a 3 VDC voltage regulator 128 ensures we have sufficient voltage to sense, and the regulated 3 VDC powers the input voltage VDD pin 132 of a CPU that contains an I2C subsystem 138 and an ADC 134. The photocell 130 is a variable resistance device whose resistance changes based upon the amount of light landing upon it and thus does not need power. As the light levels vary, the resistance of the photocell 130 varies and thus the analog voltage flowing across the pin of the ADC 134 changes. In embodiments, the CPU sets a timer so that it senses the analog voltage periodically, for example, one second intervals, and during these CPU timer-controlled intervals the CPU broadcasts the measurement from the photocell via any one of a plurality of common local network protocols, one of which is supported by a subsystem 140 that is embedded in the CPU. In embodiments, the application (see below) gets the measurements from any and all light measurement sensors defined or 'known' to it and uses these measurements in reporting the light level for lights controlled by the sensor(s) via networking methods previously discussed.

Figure 17:
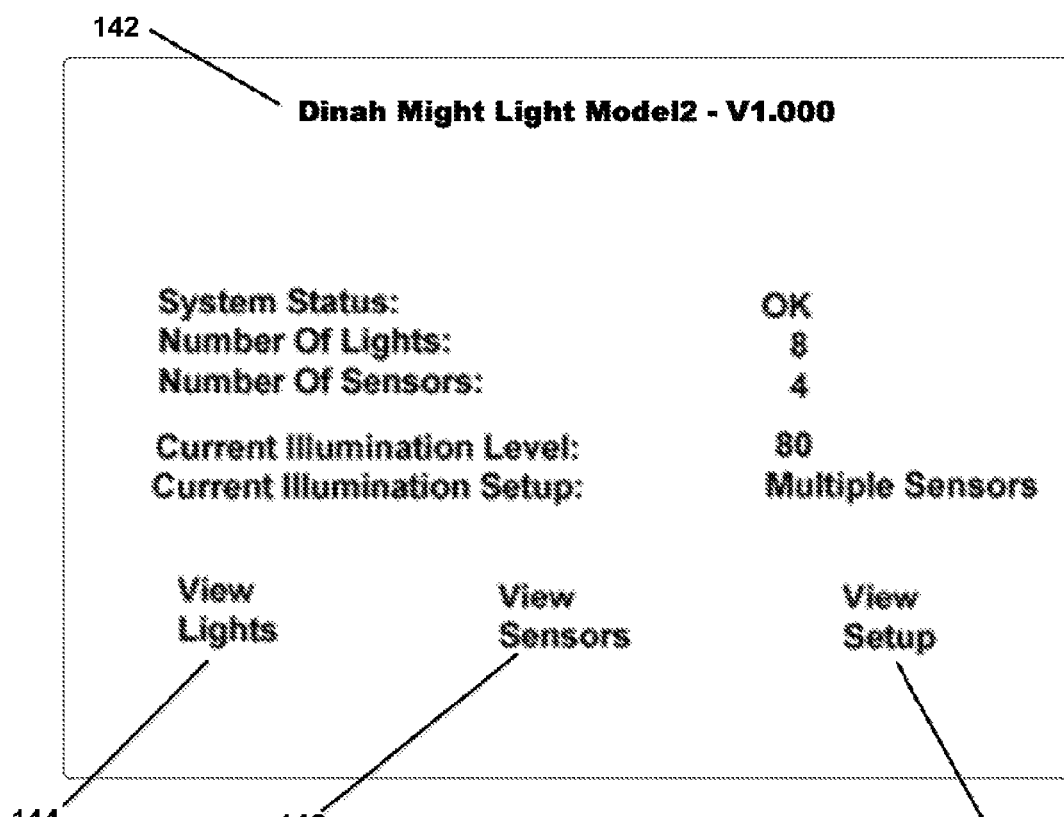
FIG. 17 shows a top-level display of the automatic dimming application.

FIG. 17 provides a screenshot of a top level display shown in a UI (user interface) of the automatically-controlled lighting application. The top level display provides a 'quick recap' of the status of the user's lighting. In the embodiment shown, the system status is 'OK', meaning there are no issues, the application is managing eight lights and four sensors, the current illumination level is 80, and multiple sensors are controlling the lights. The application displays its name and maintenance level in a header area 142 near the top of the display, and provides three sub-functions: View/maintain the known lights 144, view/maintain the known sensors 146, and change the brightness or the sensor control over the lights via a 'setup' feature 148.

Figure 18:
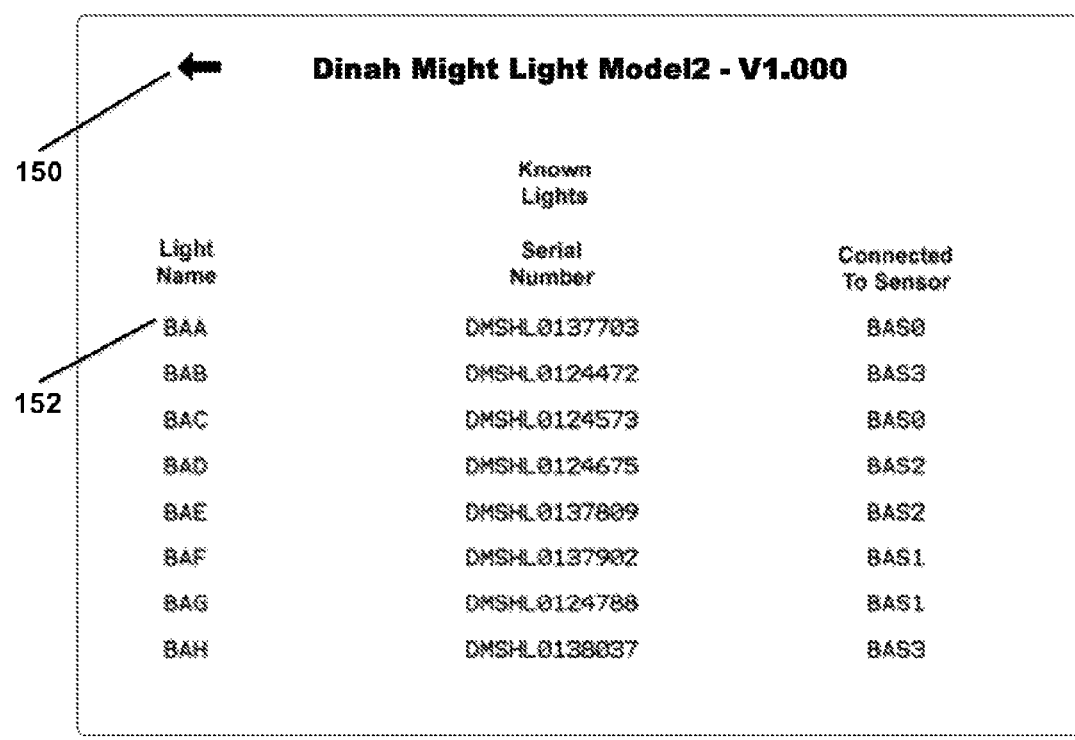
FIG. 18 shows a light management display of the automatic dimming application.

In FIG. 18, a view the application UI presents to the user of all the known lights is shown. The known lights are listed in ascending sequential light 'Name', which is a user-chosen field. If the light shown is new and has not been assigned a 'Name', the user can tap on the 'Name' field and enter it. For each light that is known, the light's serial number and controlling sensor, if any, are shown. As the configuration changes:
- if lights are unplugged, the application may note the change to the user or may simply continue to show the known lights remaining;
- if lights have been renamed, the application may note the light's old and new names to the user, or may simply display the light's new name in the known light list.

In FIG. 19, a view the application UI presents to the user of all the known sensors is shown. The known sensors are listed in ascending sequential sensor 'Name', which is a user-chosen field. If the sensor shown is new and has not been assigned a 'Name', the user can tap on the 'Name' field and enter it. For each sensor that is known, the sensor's serial number and controlled light(s), if any, are shown. As the configuration changes:
- if sensors are removed, the application may note the change to the user or may simply continue to show the known sensors remaining;
- if sensors have been renamed, the application may note the sensor's old and new names to the user, or may simply display the sensor's new name in the known sensor list.

Figure 20:
FIG. 20 shows a setup display of the automatic dimming application.

In FIG. 20, a view the application UI presents to the user for modifying the system-wide configuration is shown. In embodiments, the current illumination level 156 is shown, along with two 'lower' and 'higher' buttons, and the user can tap or click the buttons to change the light level, or can tap the number and enter a new light level value via the application's keyboard. In embodiments, the option of using one sensor to control all lights or using multiple sensors to control individual lights 158 is shown, and the user can tap the "Change" button to switch from one method to the other.

Figure 21:
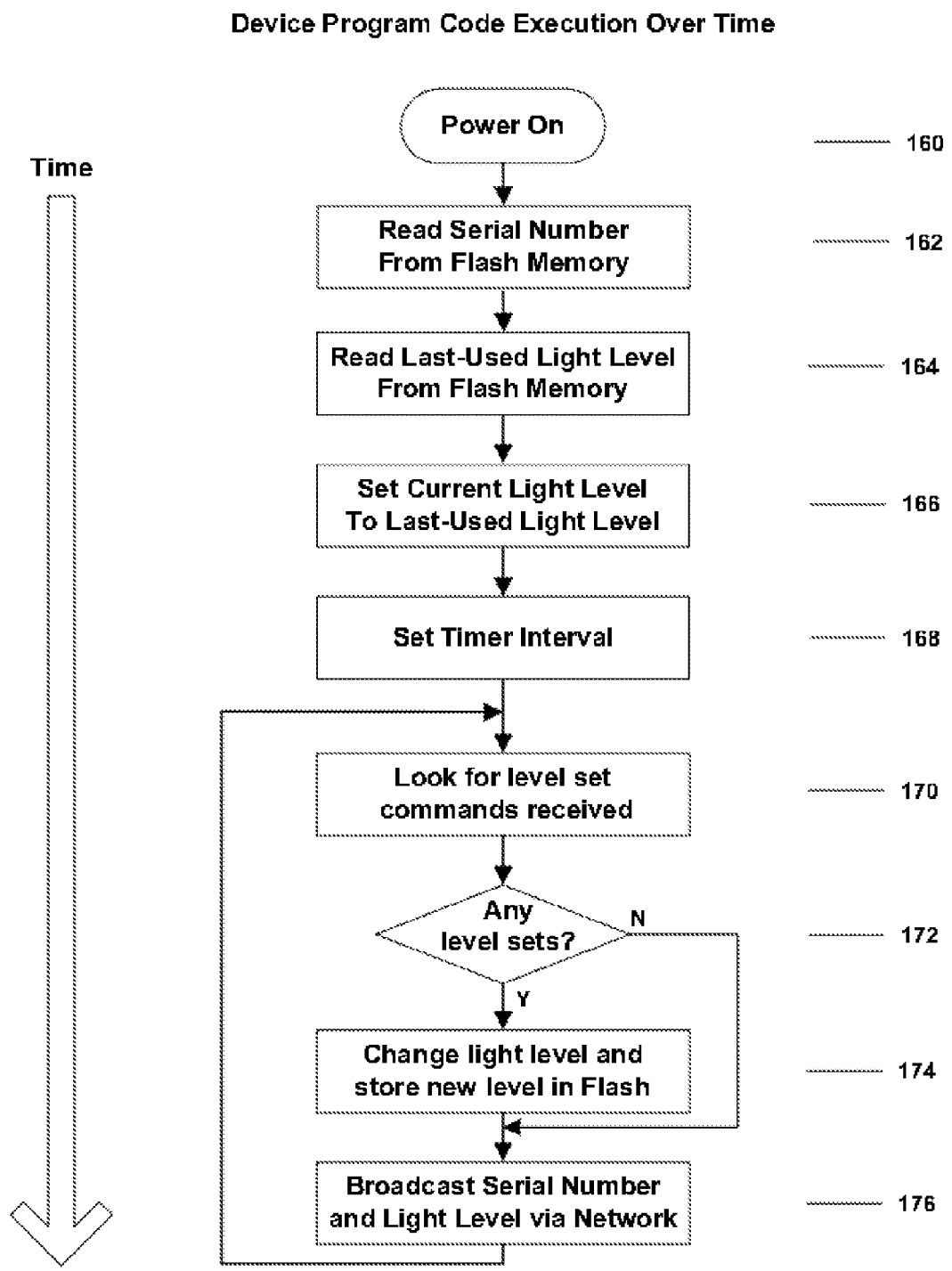
FIG. 21 provides a functional block diagram of a light control software program.

In FIG. 21, the steps performed by program code executing on a light's CPU are shown. In the embodiment shown, beginning at the time of power-on 160, the CPU may:
- read its Serial Number from Flash memory 162;
- read the last-used light level from Flash memory 164;
- set the starting/about-to-be current light level as the last-used light level 166;
- set the timer interval, in embodiments, somewhere between 10 ms and 10 s 168;
- look for 'set the level' commands received by the light from the application via the common Networking protocol(s) 170;
- if 'set the level' commands were found 172, process them to change the light level chronologically 174; and
- broadcast the light's serial number, 'Name', and current light level setting using the common Networking protocol(s) 176.

Figure 22:
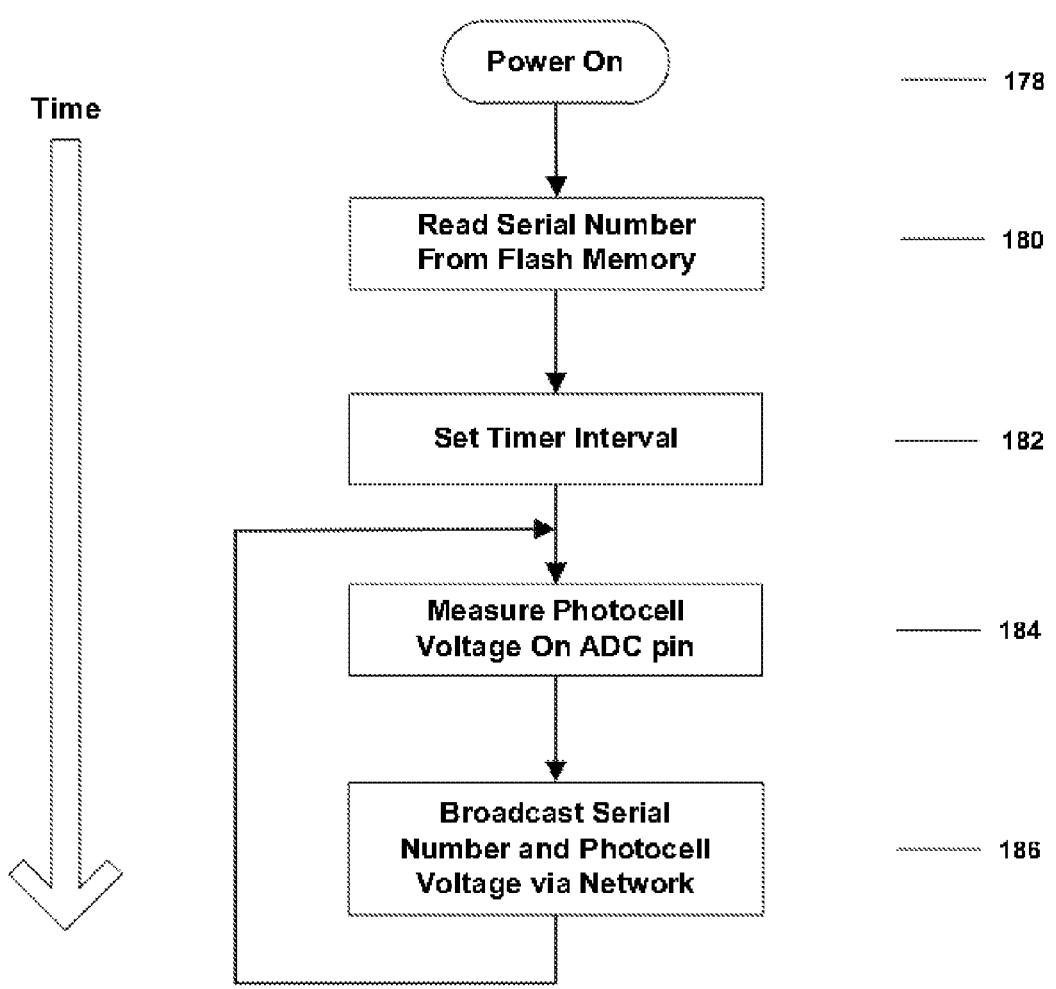
FIG. 22 provides a functional block diagram of a sensor control software program.

In FIG. 22, the steps followed by performed by program code executing on a sensor's CPU are shown. In the embodiment shown, beginning at the time of power-on 178, the CPU may:
- read its Serial Number from Flash memory 180;
- set the timer interval, in embodiments, somewhere between 10 ms and 10 s 182;
- measures the voltage across the ADC subsystem's pin of the CPU 184; and
- broadcast the sensor's serial number, 'Name', and current light level using the common Networking protocol(s) 186.

The invention claimed is:

1. An LED light, comprising:
   at least one LED (light-emitting diode);
   at least one heat dispersion device to dissipate said LED's heat;
   at least one type of cooling apparatus to cool said heat dispersion device;
   a dimmer, wherein said dimmer comprises one of:
   manually operated; and
   programmatically controlled;
   at least one rectifier;
   at least one non-volatile storage device;
   at least one analog-to-digital converter;
   a positioning-fixative device comprising a hex head bolt; and
   at least one processor comprising program code for controlling said light and said cooling apparatus.

2. The LED light of claim 1, wherein each of said at least one heat dispersion device comprises one of:
   a heat sink;
   a radiator; and
   heat dispersal fins.

3. The LED light of claim 1, wherein each of said at least one processor comprises one of:
   a microprocessor;
   a microcontroller; and
   a CPU.

4. The LED light of claim 1, wherein said program code for controlling said light and said cooling apparatus comprises program code for giving users the ability to view any of:
   the light's serial number;
   the light's user-assigned 'Name', if any; and
   the light's current light output level, measured using empirical measurement units.

5. The LED light of claim 1, wherein said light further comprises at least one enclosure defining at least one interior space for receiving:
   said LED;
   said heat dispersion devices;
   said cooling apparatus;
   said apparatus that performs said dimming function;
   said non-volatile storage device;
   said rectifier;
   said analog-to-digital converters; and
   said processor.

6. The LED light of claim 1, wherein said light communicates with the internet using a processor running program code for communications using common networking protocols.

7. The LED light of claim 1, wherein said light is configured for use with a grid system, and wherein said light is vertically movable without any additional mechanism other than the grid system.

8. The LED light of claim 1, wherein said light can be dimmed either via:
   manual dimming using manually-operated, self-contained components; and
   automatic dimming using light level data.

* * * * *